United States Patent
Wang

(10) Patent No.: US 10,156,753 B2
(45) Date of Patent: Dec. 18, 2018

(54) BACKLIGHT MODULE AND DISPLAY DEVICE

(71) Applicant: BOE Technology Group Co., Ltd., Beijing (CN)

(72) Inventor: Shang Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 29 days.

(21) Appl. No.: 15/300,351

(22) PCT Filed: Jan. 13, 2016

(86) PCT No.: PCT/CN2016/070748
§ 371 (c)(1),
(2) Date: Sep. 29, 2016

(87) PCT Pub. No.: WO2017/024764
PCT Pub. Date: Feb. 16, 2017

(65) Prior Publication Data
US 2017/0184919 A1    Jun. 29, 2017

(30) Foreign Application Priority Data

Aug. 10, 2015  (CN) .......................... 2015 1 0487447

(51) Int. Cl.
*G02F 1/1335*    (2006.01)

(52) U.S. Cl.
CPC .. *G02F 1/133615* (2013.01); *G02F 1/133611* (2013.01); *G02F 1/133603* (2013.01); *G02F 2001/133607* (2013.01)

(58) Field of Classification Search
CPC ................................................ G02F 1/133615
See application file for complete search history.

(56) References Cited

U.S. PATENT DOCUMENTS 8,334,946 B2    12/2012 Karakawa
2005/0007000 A1*    1/2005 Chou .................... H01L 27/156
                                                                 313/116
(Continued)

FOREIGN PATENT DOCUMENTS

CN         2421510 Y    2/2001
CN         2687711 Y    3/2005
(Continued)

OTHER PUBLICATIONS

May 5, 2016—(WO)—International Search Report and Written Opinion Appn PCT/CN2016/070748 with English Tran.
(Continued)

*Primary Examiner* — Edmond Lau
(74) *Attorney, Agent, or Firm* — Banner & Witcoff, Ltd.

(57) ABSTRACT

A backlight module and a display device are provided. The backlight module includes a light source, a plate-shaped light intensity splitting component and a reflecting sheet, wherein, the plate-shaped light intensity splitting component and the reflecting sheet are oppositely arranged to form an empty light guide space therebetween, and the plate-shaped light intensity splitting component is configured to split incident light from the light source into reflected light facing to the reflecting sheet and transmission light passing through the plate-shaped light intensity splitting component. The backlight module without adopting a light guide plate can save cost for manufacturing the backlight module and is advantageous to improve light utilization efficiency.

19 Claims, 5 Drawing Sheets

(56) References Cited

U.S. PATENT DOCUMENTS

| | | | |
|---|---|---|---|
| 2006/0262397 A1 | 11/2006 | Lee et al. | |
| 2006/0290844 A1* | 12/2006 | Epstein | G02F 1/133615 349/113 |
| 2010/0053936 A1* | 3/2010 | Kiyose | G02B 6/0091 362/97.1 |
| 2015/0353417 A1* | 12/2015 | Mori | C03C 17/007 359/599 |

FOREIGN PATENT DOCUMENTS

| | | |
|---|---|---|
| CN | 1839340 A | 9/2006 |
| CN | 201081152 Y | 7/2008 |
| CN | 101604097 A | 12/2009 |
| CN | 101672949 A | 3/2010 |
| CN | 202469764 U | 10/2012 |
| CN | 104633531 A | 5/2015 |
| CN | 104791668 A | 7/2015 |
| CN | 105090826 A | 11/2015 |
| JP | 095737 A | 10/1997 |
| JP | 2004138633 A | 5/2004 |
| JP | 2005209475 A | 8/2005 |

OTHER PUBLICATIONS

Feb. 17, 2017—(CN) First Office Action Appn 201510487447.0 with English Tran.

\* cited by examiner

BACKLIGHT MODULE AND DISPLAY DEVICE

The application is a U.S. National Phase Entry of International Application No. PCT/CN2016/070748 filed on Jan. 13, 2016, designating the United States of America and claiming priority to Chinese Patent Application No. 201510487447.0 filed on Aug. 10, 2015. The present application claims priority to and the benefit of the above-identified applications and the above-identified applications are incorporated by reference herein in their entirety.

TECHNICAL FIELD

Embodiments of the present disclosure relate to a backlight module and a display device.

BACKGROUND

In recent years, a liquid crystal display is widely applied to a consumer electronic product, such as a mobile phone, a portable computer, a flat television and the like. The liquid crystal display includes a backlight module for providing a surface light source for a liquid crystal display panel. According to different positions of the light source, the backlight module may be divided into an edge-lit backlight module and a direct-lit backlight module, wherein the light source of the edge-lit backlight module is arranged on a lateral side of a light emergent surface, and the light source of the direct-lit backlight module is arranged on a backside of a light emergent surface.

SUMMARY

An embodiment of the present disclosure provides a backlight module, including a light source, a plate-shaped light intensity splitting component and a reflecting sheet, wherein, the plate-shaped light intensity splitting component and the reflecting sheet are oppositely arranged to form an empty light guide space therebetween, and the plate-shaped light intensity splitting component is configured to split incident light from the light source into reflected light facing to the reflecting sheet and transmission light passing through the plate-shaped light intensity splitting component.

Another embodiment of the present disclosure provides a display device, including the backlight module as described above and a display panel, wherein, the backlight module is arranged on a side of the display panel opposite to a display surface, and the display panel and the reflecting sheet are located on opposite sides of the plate-shaped light intensity splitting component respectively.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
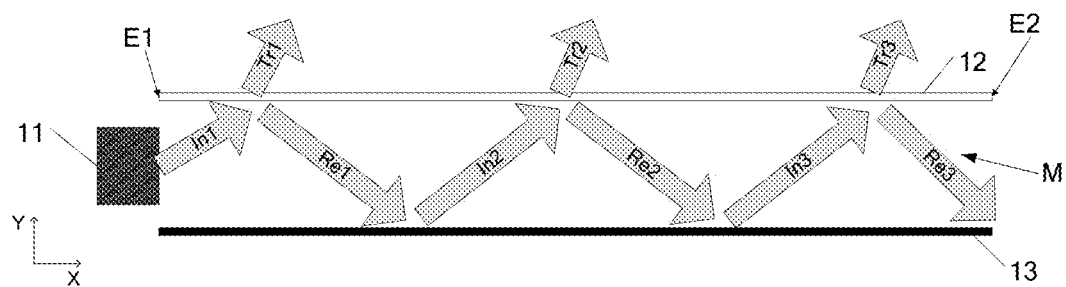
FIG. 1 shows a partial cross-sectional schematic diagram of an edge-lit backlight module provided by an embodiment of the present disclosure.

In order to make objects, technical details and advantages of the embodiments of the disclosure apparent, the technical solutions of the embodiment will be described in a clearly and fully understandable way in connection with the drawings related to the embodiments of the disclosure. With reference to non-restrictive exemplary embodiments shown in the drawings and described in detail in the following description, exemplary embodiments of the present disclosure and their various features and favorable details are illustrated more comprehensively. It should be noted that, the features shown in the drawings are not necessarily drawn according to scale. Known materials, components and process technologies have not been described so as not to obscure the exemplary embodiments of the present disclosure. Examples are merely intended to facilitate understanding of implementation of exemplary embodiments of the present disclosure, and further enable those skilled in the art to implement the exemplary embodiments. Therefore, the examples should not be construed as limiting the scope of the exemplary embodiments of the present disclosure. It should be noted that, in all embodiments of the present disclosure, like terms and like reference signs are used for denoting same components, and thus the same components will not be repeatedly described.

Unless otherwise defined, the technical terms or scientific terms here should be of general meaning as understood by those ordinarily skilled in the art. In the present disclosure, words such as "first", "second" and the like do not denote any order, quantity, or importance, but rather are used for distinguishing different components. Words such as "up", "down", "left", "right" and the like are only used for expressing relative positional relationship, when the absolute position of a described object is changed, the relative positional relationship may also be correspondingly changed.

A light sources employed in a backlight module commonly is point light source or a line light source, and how to guide light rays from the point light sources and/or line light source into uniform surface light sources is one of key points of a backlight module design.

Embodiments of the present disclosure provide a backlight module and a display device; by utilizing a plate-shaped light intensity splitting component and a reflecting sheet that are arranged oppositely, light rays from a light source can be guided to uniformly exit from a light emergent surface in a form of surface light source.

An embodiment of the present disclosure provides an edge-lit backlight module, as shown in FIG. 1, including a light source 11, a plate-shaped light intensity splitting component 12 and a reflecting sheet 13. The plate-shaped light intensity splitting component 12 and the reflecting sheet 13 are oppositely arranged to form an empty light guide space M therebetween. The plate-shaped light intensity splitting component 12 is configured to split incident light from the light source 11 into reflected light facing to the reflecting sheet and transmission light passing through the plate-shaped light intensity splitting component. The light source 11 is located on a same side of the plate-shaped light intensity splitting component 12 and the reflecting sheet 13, and light rays emitted from the light source 11 get incident into the light guide space M. The light source 11, for example, is a point light source or a line light source.

With reference to FIG. 1, for example, first incident light In1 directly emitted from the light source 11 and incident upon the plate-shaped light intensity splitting component 12 is split into first reflected light Re1 facing to the reflecting sheet 13 and first transmission light Tr1 passing through the plate-shaped light intensity splitting component 12 by the plate-shaped light intensity splitting component 12; the first reflected light Re1 is reflected into second incident light In2 via the reflecting sheet 13, and the second incident light In2 gets incident upon the plate-shaped light intensity splitting component 12 again and is further split into second reflected light Re2 facing to the reflecting sheet 13 and second transmission light Tr2 passing through the plate-shaped light intensity splitting component 12 by the plate-shaped light intensity splitting component 12; the second reflected light Re2 is reflected into third incident light In3 via the reflecting sheet 13, and the third incident light In3 gets incident upon the plate-shaped light intensity splitting component 12 again and is further split into third reflected light Re3 facing to the reflecting sheet 13 and third transmission light Tr3 passing through the plate-shaped light intensity splitting component 12 by the plate-shaped light intensity splitting component 12, and so on. Thus, the first incident light In1 from the light source exits the backlight module through an upper surface of the plate-shaped light intensity splitting component 12, by at least first to third transmission light Tr1 to Tr3 in a direction X away from the light source 11. That is, along the light guide space M, the first incident light In1, on one hand gradually upwardly exits the plate-shaped light intensity splitting component 12, on the other hand, travel in the direction X away from the light source 11. Similarly, light rays directly emitted from the light source 11 and incident upon the plate-shaped light intensity splitting component 12 with an incident angle different from that of the first incident light In1 also on one hand gradually upwardly exits the plate-shaped light intensity splitting component 12, on the other hand, travel in the direction X away from the light source 11 along the light guide space M, by being reflected and transmitted by the plate-shaped light intensity splitting component 12 for multiple times and reflected by the reflecting sheet 13 for multiple times. As a result, the light rays from the light source 11 are guided by the plate-shaped light intensity splitting component 12 and the reflecting sheet 13 to upwardly exit the plate-shaped light intensity splitting component 12 in a form of surface light source.

Compared with an edge-lit backlight module employing a light guide plate, the backlight module provided by the embodiment of this application does not need to employ a light guide plate, thereby saving manufacturing cost of the backlight module. In addition, propagation of the light rays in the empty light guide space (i.e., in air) between the plate-shaped light intensity splitting component 12 and the reflecting sheet 13 is lower in loss with respect to propagation in the light guide plate, thus facilitating an increasing in light utilization efficiency of the backlight module.

Figure 2:
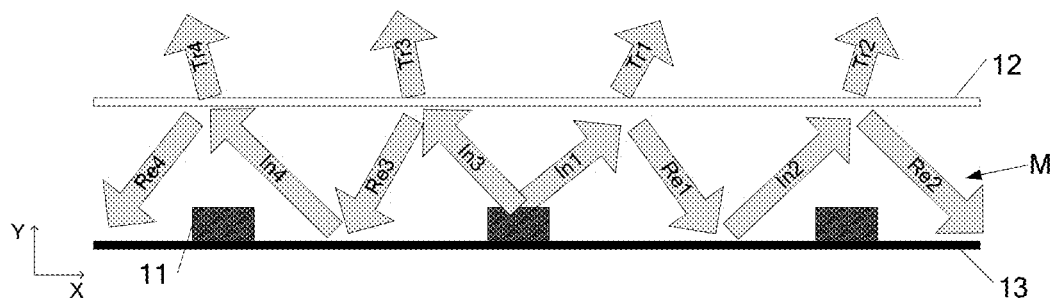
FIG. 2 shows a partial cross-sectional schematic diagram of a direct-lit backlight module provided by an embodiment of the present disclosure.

Another embodiment of the present disclosure provides a direct-lit backlight module, as shown in FIG. 2, including a plurality of light sources 11, a plate-shaped light intensity splitting component 12 and a reflecting sheet 13. For example, the plurality of light sources 11, for example, is arranged on the reflecting sheet 13. The plurality of light sources 11 emits light towards the plate-shaped light intensity splitting component 12. The light sources 11, for example, are point light sources or line light sources. The plate-shaped light intensity splitting component 12 and the reflecting sheet 13 are arranged oppositely to form an empty light guide space M therebetween. The plate-shaped light intensity splitting component 12 is configured to split incident light from the light sources 11 into reflected light facing to the reflecting sheet and transmission light passing through the plate-shaped light intensity splitting component.

FIG. 2 schematically shows three light sources 11, and shows a propagation mode of part of light rays in the light guide space M, by taking light emitted from a middle light source 11 as an example. In a rightward direction X of the middle light source 11, first incident light In1 directly emitted from the meddle light source 11 and incident upon the plate-shaped light intensity splitting component 12 is split into first reflected light Re1 facing to the reflecting sheet 13 and first transmission light Tr1 passing through the plate-shaped light intensity splitting component 12 by the plate-shaped light intensity splitting component 12; the first reflected light Re1 is reflected into second incident light In2 via the reflecting sheet 13, and the second incident light In2 gets incident upon the plate-shaped light intensity splitting component 12 again and is further split into second reflected light Re2 facing to the reflecting sheet 13 and second transmission light Tr2 passing through the plate-shaped light intensity splitting component 12 by the plate-shaped light intensity splitting component 12, and so on. In a leftward direction −X of the middle light source 11, third incident light In3 directly emitted from the middle light source 11 and incident upon the plate-shaped light intensity splitting component 12 is split into third reflected light Re3 facing to the reflecting sheet 13 and third transmission light Tr3 passing through the plate-shaped light intensity splitting component 12 by the plate-shaped light intensity splitting component 12; the third reflected light Re3 is reflected into fourth incident light In4 via the reflecting sheet 13, and the fourth incident light In4 gets incident upon the plate-shaped light intensity splitting component 12 again and is further split into fourth reflected light Re4 facing to the reflecting sheet 13 and fourth transmission light Tr4 passing through the plate-shaped light intensity splitting component 12 by the plate-shaped light intensity splitting component 12, and so on. Thus, the incident light In1 and In3 from the middle light source 11 exits the backlight module via an upper surface of the plate-shaped light intensity splitting component 12, by at least first to fourth transmission light Tr1 to Tr4 in the directions X and −X away from the middle light source 11. That is, the first incident light In1, along the light guide space M, on one hand gradually and upwardly exits the plate-shaped light intensity splitting component 12, and on the other hand, travels in the directions X and −X away from the middle light source 11. Similarly, in the embodiment as shown in FIG. 2, light rays emitted from the light source 11 on the left and the light source 11 on the right also gradually and upwardly exit the plate-shaped light intensity splitting component 12, and on the other hand, travels in the directions X and −X away from the light sources 11 along the light guide space M, by being reflected and transmitted by the plate-shaped light intensity splitting component 12 for multiple times and reflected by the reflecting sheet 13 for multiple times. As a result, the light rays from the plurality of light sources 11 are guided by the plate-shaped light intensity splitting component 12 and the reflecting sheet 13 to upwardly exit the plate-shaped light intensity splitting component 12 in a form of surface light sources.

In the backlight module provided by the above-described embodiment, the plate-shaped light intensity splitting component 12 is also called as a transflective film, which splits incident light into transmission light and reflected light according to a certain transmittance-to-reflectance ratio. A transmittance-to-reflectance ratio of the plate-shaped light intensity splitting component is a light intensity ratio of transmission light to reflected light at an incident position.

In some examples, in at least part of region of the backlight module, the transmittance-to-reflectance ratio of the plate-shaped light intensity splitting component 12 increases in a direction away from the light source 11.

In the embodiment as shown in FIG. 1, for example, the plate-shaped light intensity splitting component 12 and the reflecting sheet 13 are in a shape of rectangles equal in planar size, and the light source 11 is arranged only along first sides E1 of the plate-shaped light intensity splitting component 12 and the reflecting sheet 13. In such case, within a planar range of the whole plate-shaped light intensity splitting component 12, the transmittance-to-reflectance ratio of the plate-shaped light intensity splitting component 12 can increase in the direction away from the light source 11, for example, the transmittance-to-reflectance ratio of the plate-shaped light intensity splitting component 12 increases in a direction X from the first side E1 closet to the light source 11 to a second side E2 furthest away from the light source 11. As light rays emitted from the light source 11 become weak in the direction X away from the light source 11, while the transmittance-to-reflectance ratio of the plate-shaped light intensity splitting component 12 increases in the direction X away from the light source 11, light intensity of transmission light Tr3 at a position relatively away from the light source 11 can be more approximate to that of transmission light Tr1 at a position relatively close to the light source 11, thus enhancing uniformity of light emitted from the backlight module in a form of surface light source.

Figure 3:
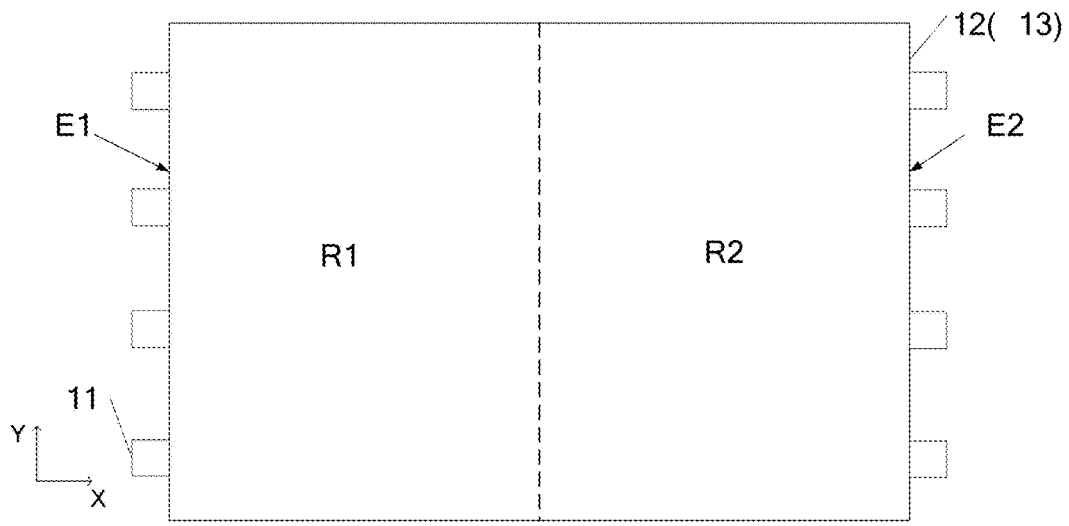
FIG. 3 shows a partial top-view schematic diagram of a direct-lit backlight module provided by an embodiment of the present disclosure.

In another example of an edge-lit backlight module provided by an embodiment of the present disclosure, as shown in FIG. 3, a first light source and a second light source 11 (respectively shown with a solid line box) are arranged along opposite first side E1 and second side E2 of a rectangular plate-shaped light intensity splitting component 12 and reflecting sheet 13 respectively. In such case, a plane where the plate-shaped light intensity splitting component 12 is located is divided into a first region R1 adjacent to the first light source and a second region R2 adjacent to the second light source by taking a center line (shown with a dashed line in FIG. 3) of the plate-shaped light intensity splitting component 12 parallel with the first side E1 and the second side E2 thereof as a boundary. In the first region R1, a transmittance-to-reflectance ratio of the plate-shaped light intensity splitting component 12 can increase in a direction X away from the first light source; similarly, in the second region R2, a transmittance-to-reflectance ratio of the plate-shaped light intensity splitting component 12 can increase in a direction −X away from the second light source, thus enhancing uniformity of light emitted from the backlight module in a form of surface light source.

Figure 4:
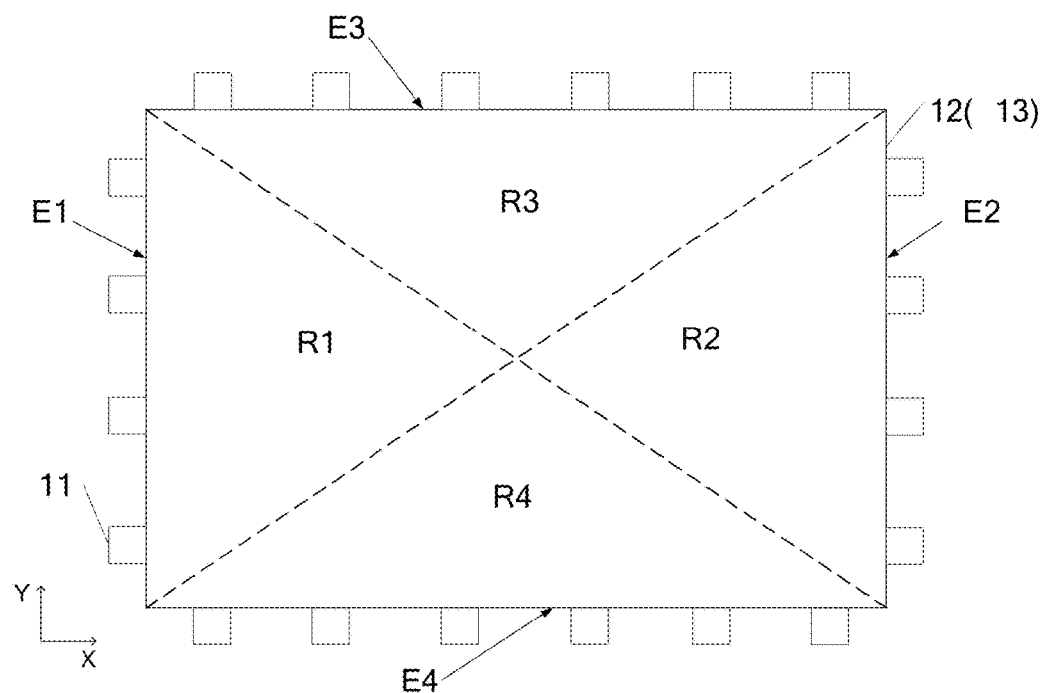
FIG. 4 shows a partial top-view schematic diagram of a direct-lit backlight module provided by an embodiment of the present disclosure.

In another example of an edge-lit backlight module provided by an embodiment of the present disclosure, as shown in FIG. 4, first to fourth light sources 11 (respectively shown with a solid line box) are arranged along first to fourth sides E1 to E4 of a plate-shaped rectangular light intensity splitting component 12 and a rectangular reflecting sheet 13 respectively. In such case, for example, a plane where the plate-shaped light intensity splitting component 12 is located is divided into first to fourth regions respectively adjacent to the first to fourth light sources by taking two diagonal lines (shown with dashed lines in FIG. 3) of the plate-shaped light intensity splitting component 12 as a boundary. In the first region, a transmittance-to-reflectance ratio of the plate-shaped light intensity splitting component 12 can be increased in a direction X away from the first light source; in the second region, a transmittance-to-reflectance ratio of the plate-shaped light intensity splitting component 12 can be increased in a direction −X away from the second light source; in the third region, a transmittance-to-reflectance ratio of the plate-shaped light intensity splitting component 12 can be increased in a direction −Y away from the third light source; in the fourth region, a transmittance-to-reflectance ratio of the plate-shaped light intensity splitting component 12 can be increased in a direction Y away from the fourth light source, thus enhancing uniformity of light emitted from the backlight module in a form of surface light source.

Figure 5:
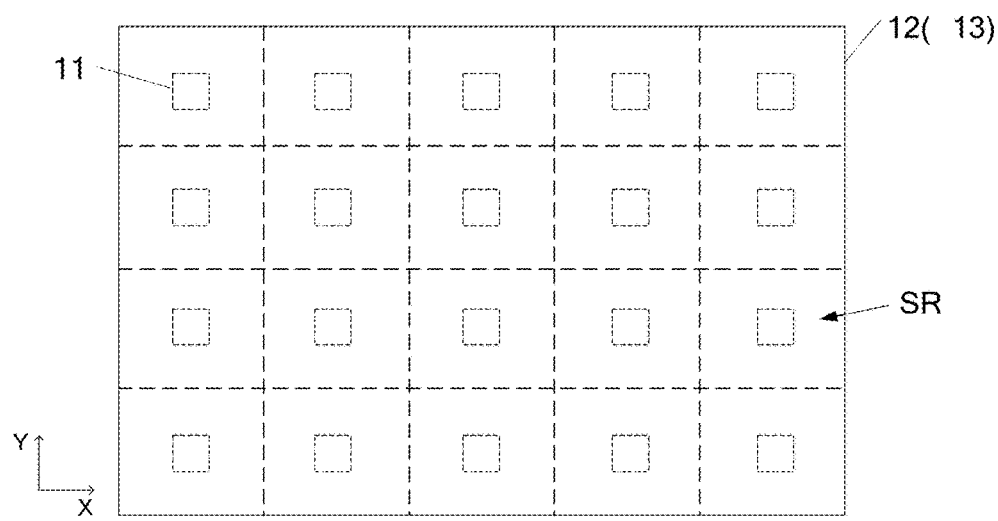
FIG. 5 shows a partial top-view schematic diagram of a direct-lit backlight module provided by an embodiment of the present disclosure.

FIG. 5 shows a top-view structural schematic diagram of a direct-lit backlight module provided by an embodiment of the present disclosure. As shown in FIG. 5, for example, a plurality of light sources 11, for example, are point light sources (shown with dashed line boxes), and are arranged between a plate-shaped light intensity splitting component 12 and a reflecting sheet 13 in an array form. For example, the plurality of light sources 11 is arranged on the reflecting sheet 13. The plurality of light sources 11 emits light towards the plate-shaped light intensity splitting component 12. Multiple dashed lines in FIG. 4 indicate perpendicular bisector of a connecting line of every two adjacent point light sources 11. The multiple dashed lines divide the plate-shaped light intensity splitting component 12 into a plurality of rectangular sub-regions SR corresponding to the plurality of light sources 11 in one to one correspondence, and a central region of each sub-region SR directly face to that of the corresponding light source 11. In each sub-region SR, a transmittance-to-reflectance ratio of the plate-shaped light intensity splitting component 12 can increase in directions away from the light source 11, for example, the transmittance-to-reflectance ratio of the plate-shaped light intensity splitting component 12 increases in directions X, −X, Y, −Y from a center of the sub-region to a periphery thereof. Thus, light rays emitted from each light source 11 are reduced in the directions X, −X, Y, −Y away from the light source 11, while the transmittance-to-reflectance ratio of the plate-shaped light intensity splitting component 12 increases in the directions X, −X, Y, −Y away from the light source 11, thus enhancing uniformity of light emitted from the backlight module in a form of surface light source.

In the above-described embodiment, the plate-shaped light intensity splitting component 12, for example, is a broadband light splitting film used for visible light, and the broadband light splitting film is also referred to as a neutral light splitting film. For example, a ratio of transmittance to reflectance of each part of the plate-shaped light intensity splitting component is 50:50.

The plate-shaped light intensity splitting component 12, for example, is a metallic light splitting film or dielectric light splitting film.

Figure 6:
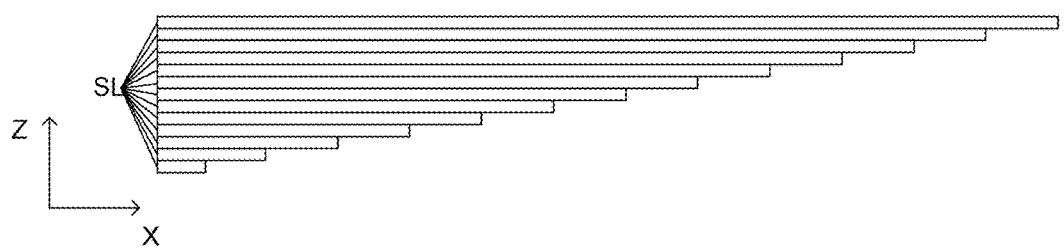
FIG. 6 shows a cross-sectional schematic diagram of a plate-shaped light intensity splitting component in a backlight module provided by an embodiment of the present disclosure.

In an example, the plate-shaped light intensity splitting component 12 is a multilayer dielectric light splitting film including multiple dielectric layers SL. For example, as shown in FIG. 6, in a case that the multiple dielectric layers SL are employed by the plate-shaped light intensity splitting component 12, in the at least part of region of the backlight module (such as a single-side light incidence edge-lit backlight module as shown in FIG. 1) provided by the above-described embodiment, the number of the dielectric layers SL of the multilayer dielectric light splitting film 12 is reduced in a direction X away from a corresponding light source, thereby increasing a transmittance-to-reflectance ratio of the multilayer dielectric light splitting film 12 in the direction X away from the corresponding light source. For example, the multilayer dielectric light splitting film 12 can employ a technology of a Vikviti™ Enhanced Specular Reflector (ESR) multilayer film of 3M Company, so that an expected transmittance-to-reflectance ratio can be realized by controlling the number of the dielectric layers included therein.

Figure 7:
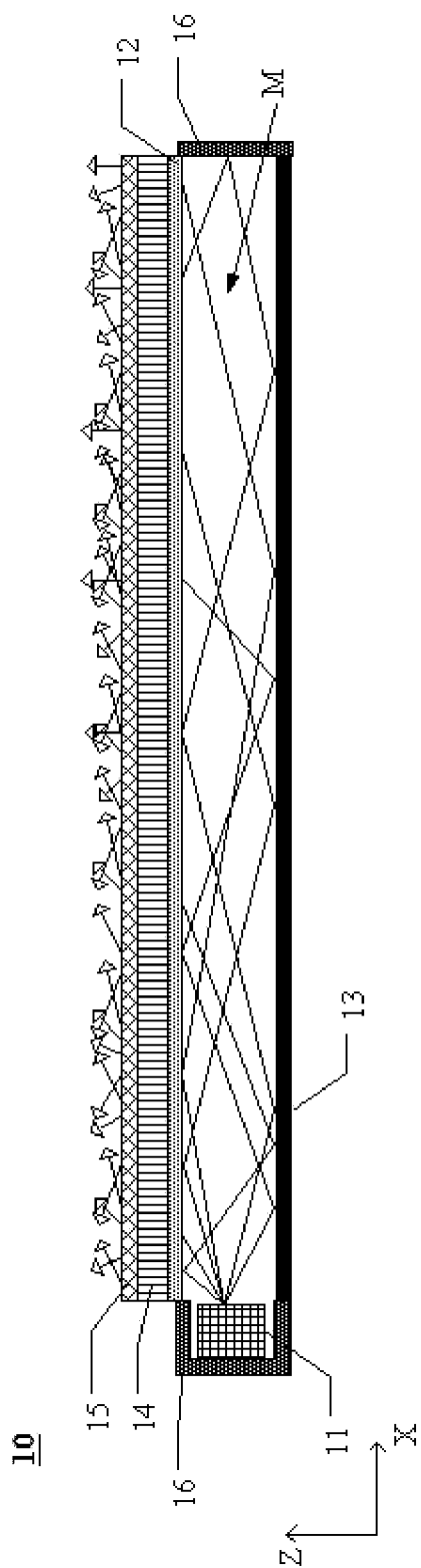
FIG. 7 shows a partial cross-sectional schematic diagram of a backlight module provided by an embodiment of the present disclosure.

Another embodiment of the present disclosure provides a backlight module 10, as shown in FIG. 7, the backlight module 10 can have a structure basically identical with that of the backlight module provided by the embodiment as shown in FIG. 1, except that the backlight module can further optionally include a supporting layer 14, a light scattering layer 15 and a light shielding component 16.

In the backlight module as shown in FIG. 7, the supporting layer 14 is arranged on a side of a plate-shaped light intensity splitting component 12 opposite to the reflecting sheet, and is used for supporting the plate-shaped light intensity splitting component 12. In an example, a refractive index of the supporting layer 14 is greater than that of the plate-shaped light intensity splitting component 12. Thus, oblique light rays emitted from the upper surface of the plate-shaped light intensity splitting component 12, such as transmission light Tr1 to Tr4 shown in FIG. 1 and FIG. 2, can be refracted by the supporting layer 14 with a higher refractive index to be more approximately upright, which thereby facilitates emergent light of the backlight module exiting in a direction Z perpendicular to a light emergent surface. In the embodiment as shown in FIG. 4, because the supporting layer 14 with the higher refractive index is arranged, more light rays emitted from the plate-shaped light intensity splitting component 12 will get incident upon the light scattering layer 15 above the supporting layer 14.

With further reference to FIG. 7, the light scattering layer 15 arranged above the supporting layer 14 is configured for scattering light rays entering therein. Thus, light rays from the light source 11 emitted from the backlight module in all directions and thus in a form of surface light source, and FIG. 7 shows part of light path in the backlight source.

In an example, the supporting layer 14 and the light scattering layer 15 can be integrally formed. For example, a base material of the light scattering layer 15 is identical with a material of the supporting layer 14, and the light scattering layer 15 is formed by doping a surface region of the base material with scattering particles different from the base material in refractive index. For example, the supporting layer 14 and the base material of the light scattering layer 15 can be high-refractive index glass. For example, the base material of the light scattering layer 15, for example, can also be flint glass, and quartz sand serving as the scattering particles is doped therein. For another example, the light scattering layer 15 can also be formed by roughening a surface of the supporting layer.

In another example, the supporting layer 14 and the light scattering layer 15 can also be formed separately.

Further, as shown in FIG. 7, light shielding component 16 arranged at side edges of the plate-shaped light intensity splitting component 12 and the reflecting sheet 13, is configured for preventing light rays from going out of the backlight module via a position beyond the light emergent surface (such as a side face of a light guide space M). In an example, the light shielding components 16 can be integrally formed with the reflecting sheet 13.

Figure 8:
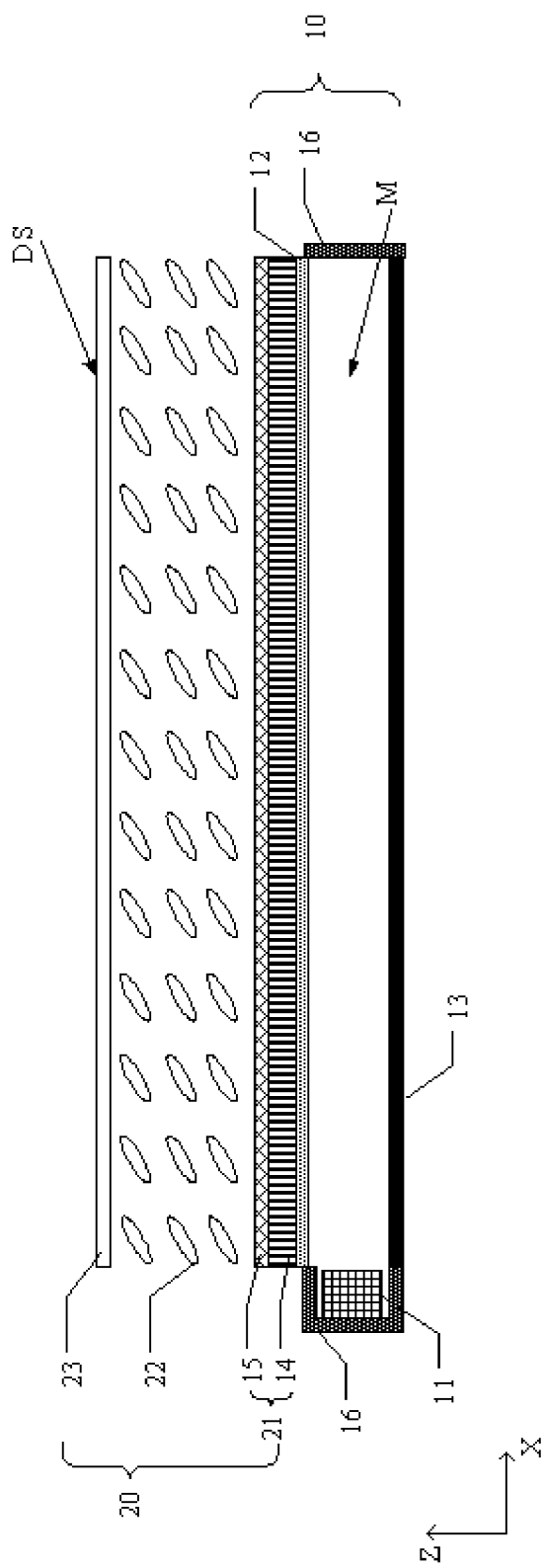
FIG. 8 shows a partial cross-sectional schematic diagram of a display device provided by an embodiment of the present disclosure.

Another embodiment of the present disclosure provides a display device, as shown in FIG. 8, for example, including the backlight module 10 provided by the embodiment as shown in FIG. 7 and a display panel 20. The backlight module 10 is arranged on a side of the display panel 20 opposite to a display surface DS, and the display panel 20 and a reflecting sheet 13 are located on opposite sides of the plate-shaped light intensity splitting component 12 respectively.

The display panel 20, for example, is a liquid crystal display panel, the display panel including a first substrate 21, a liquid crystal layer 22 and a second substrate 23 sequentially disposed in a direction Z away from the backlight module 10.

As shown in FIG. 8, the first substrate 21 of the display panel 20, for example, can be used as both the supporting layer 14 and the light scattering layer 15 of the backlight module 10. The plate-shaped light intensity splitting component 12 is integrated to a lower surface of the first substrate 10 opposite to the liquid crystal layer 21. For example, the plate-shaped light intensity splitting component 12 can be directly deposited on the lower surface of the first substrate 10 opposite to the liquid crystal layer 21, which thus may further save cost and increase an integration level of the display device.

In another example, the light scattering layer 15 may be not included in the above-described display device. In such case, a first substrate 12, for example, can only be used as the supporting layer 14 of the backlight module 10.

In another example, in the above-described display device, a first substrate 21 of the display panel 20 and a supporting layer 14 in the backlight module 10 can also be provided separately.

In the embodiment as shown in FIG. 8, the supporting layer 14 and the light scattering layer 15 can be integrally formed. For example, the base material of the light scattering layer 15 is identical with the material of the supporting layer 14, and the light scattering layer 15 is formed by doping a surface region of the base material with scattering particles different from the base material in refractive index. For example, the supporting layer 14 can be a flint glass layer, and the base material of the light scattering layer 15, for example, can also be flint glass, and quartz sand serving as the scattering particles is doped therein.

For example, a plurality of gate lines and a plurality of data lines, for example, can be formed on an upper surface of the first substrate 21 of the display panel 20, these gate lines and data lines intersect with each other, thereby defining pixel units arranged in matrix; each pixel unit may include a thin film transistor serving as a switch element and a pixel electrode (and common electrode) used for controlling alignment of liquid crystals. A gate electrode of the thin film transistor of each pixel is electrically connected or integrally formed with a corresponding gate line, a source electrode is electrically connected or integrally formed with a corresponding data line, and a drain electrode is electrically connected or integrally formed with a corresponding pixel electrode. A color filter layer and a black matrix layer, for example, are formed on a lower surface of the second substrate 23 of the display panel 20, so as to form a color filter substrate.

With further reference to FIG. 8, a refractive index of the first substrate 21 of the display panel can be greater than that of the plate-shaped light intensity splitting component 12 of the backlight module 10, so as to enable light rays incident upon interfaces of the plate-shaped light intensity splitting component 12 and the first substrate 21 to enter the first substrate 21 with a relatively small refraction angle, which may facilitate emergent light of the backlight module 10 exiting in a direction perpendicular to a light emergent surface.

In addition, in FIG. 8, the backlight module 10 further includes light shielding components arranged around the light guide space M, and the light shielding component is configured for preventing light rays exit the backlight module via a position beyond the light emergent surface (such as, a side face of the light guide space M). In an example, the light shielding component 16 may be integrally formed with a reflecting sheet 13.

Although the embodiment of the disclosure has been described above in great detail with general descriptions and specific embodiments, on the basis of the embodiment of the disclosure, various changes and improvements may be made, which is apparent to those skilled in the art. Therefore, all such changes and improvements without departing from the spirit of the disclosure are within the scope of the claims of the disclosure.

The present application claims priority of Chinese Patent Application No. 201510487447.0 filed on Aug. 10, 2015, the present disclosure of which is incorporated herein by reference in its entirety as part of the present application.

The invention claimed is:

1. A backlight module, comprising a light source, a plate-shaped light intensity splitting component and a reflecting sheet, wherein the plate-shaped light intensity splitting component and the reflecting sheet are oppositely arranged to form an empty light guide space therebetween, wherein the plate-shaped light intensity splitting component is configured to split incident light from the light source into reflected light facing to the reflecting sheet and transmission light passing through the plate-shaped light intensity splitting component, and wherein in at least part of a region of the backlight module, a transmittance-to-reflectance radio of the plate-shaped light intensity splitting component increases in a direction away from the light source, wherein the transmittance-to-reflectance ratio of the plate-shaped light intensity splitting component is a light intensity ratio of the transmission light to the reflected light at an incident position.

2. The backlight module according to claim 1, wherein the plate-shaped light intensity splitting component is a multi-layer dielectric light splitting film.

3. The backlight module according to claim 1, wherein the plate-shaped light intensity splitting component is a multi-layer dielectric light splitting film, and in the at least part of the region of the backlight module, a number of dielectric layers of the multilayer dielectric light splitting film decreases in the direction away from the light source.

4. The backlight module according to claim 1, wherein the light source is arranged at side edges of the plate-shaped light intensity splitting component and the reflecting sheet, so that the backlight module is an edge-lit backlight module.

5. The backlight module according to claim 1, wherein a plurality of light sources are arranged in the light guide space and emit light towards the plate-shaped light intensity splitting component, so that the backlight module is a direct-lit backlight module.

6. The backlight module according to claim 1, further comprising a supporting layer arranged on a side of the plate-shaped light intensity splitting component opposite to the reflecting sheet, wherein a refractive index of the supporting layer is greater than that of the plate-shaped light intensity splitting component.

7. The backlight module according to claim 1, further comprising a light scattering layer arranged on a side of the plate-shaped light intensity splitting component opposite to the reflecting sheet.

8. The backlight module according to claim 1, further comprising a supporting layer and a light scattering layer that are arranged on a side of plate-shaped light intensity splitting component opposite to the reflecting sheet, wherein the supporting layer is located between the light scattering layer and the plate-shaped light intensity splitting component, and wherein the supporting layer and the light scattering layer are integrally formed.

9. The backlight module according to claim 8, wherein the supporting layer is a flint glass layer, and the light scattering layer is a flint glass layer doped with quartz sand therein.

10. The backlight module according to claim 1, further comprising light shielding components arranged at side edges of the plate-shaped light intensity splitting component and the reflecting sheet.

11. A display device, comprising the backlight module according to claim 1 and a display panel, wherein the backlight module is arranged on a side of the display panel opposite to a display surface, and the display panel and the reflecting sheet are located on opposite sides of the plate-shaped light intensity splitting component respectively.

12. The display device according to claim 11, wherein the display panel includes a first substrate, a liquid crystal layer and a second substrate sequentially disposed in a direction away from the backlight module, and the plate-shaped light intensity splitting component is integrated to a side of the first substrate opposite to the liquid crystal layer.

13. The display device according to claim 12, wherein a refractive index of the first substrate is greater than that of the plate-shaped light intensity splitting component.

14. The display device according to claim 12, wherein scattering particles are dispersed in the first substrate.

15. The display device according to claim 14, wherein the first substrate has a first surface facing to the plate-shaped light intensity splitting component and a second surface facing away from the plate-shaped light intensity splitting component, and the scattering particles are closer to the second surface than to the first surface.

16. The display device according to claim 14, wherein the first substrate is a flint glass substrate, and the scattering particles are quartz sand.

17. The display device according to claim 11, wherein the backlight module further comprises light shielding components arranged at side edges of the plate-shaped light intensity splitting component and the reflecting sheet.

18. The backlight module according to claim 2, further comprising a supporting layer arranged on a side of the plate-shaped light intensity splitting component opposite to the reflecting sheet, wherein a refractive index of the supporting layer is greater than that of the plate-shaped light intensity splitting component.

19. The backlight module according to claim 1, wherein the at least part of the region of the backlight module is a top-view region of the backlight module.

* * * * *